US 9,935,956 B1

(12) United States Patent
Cha et al.

(10) Patent No.: US 9,935,956 B1
(45) Date of Patent: Apr. 3, 2018

(54) DEVICES AND METHODS CONFIGURED TO CONTROL NETWORK ACCESS TIME

(71) Applicant: Western Digital Technologies, Inc., Irvine, CA (US)

(72) Inventors: Derek Hee Jun Cha, Irvine, CA (US); Paul Chen, Hungtington Beach, CA (US)

(73) Assignee: Western Digital Technology, Inc., San Jose, CA (US)

( * ) Notice: Subject to any disclaimer, the term of this patent is extended or adjusted under 35 U.S.C. 154(b) by 702 days.

(21) Appl. No.: 13/717,481

(22) Filed: Dec. 17, 2012

(51) Int. Cl.
G06F 15/173 (2006.01)
H04L 29/06 (2006.01)

(52) U.S. Cl.
CPC .................... H04L 63/10 (2013.01)

(58) Field of Classification Search
CPC ........ H04W 48/00; G06F 15/16; H04L 63/10; H04L 63/101; H04L 41/28
USPC .................................................. 709/225, 224
See application file for complete search history.

(56) References Cited

U.S. PATENT DOCUMENTS

| 7,283,505 | B1 * | 10/2007 | Meenan | H04L 12/2814 370/338 |
|---|---|---|---|---|
| 7,313,384 | B1 * | 12/2007 | Meenan | H04L 63/08 455/410 |
| 7,337,219 | B1 * | 2/2008 | Meenan | H04L 12/2807 709/220 |
| 7,383,339 | B1 * | 6/2008 | Meenan | H04L 12/5692 370/352 |
| 7,428,585 | B1 * | 9/2008 | Owens, II | G06F 21/6218 709/223 |
| 7,752,329 | B1 * | 7/2010 | Meenan | H04L 12/66 709/217 |
| 7,768,920 | B2 | 8/2010 | Goshen et al. | |
| 8,103,244 | B2 | 1/2012 | Tran et al. | |
| 8,200,840 | B1 | 6/2012 | Maleki et al. | |
| 8,276,193 | B2 * | 9/2012 | Cox et al. | 726/4 |
| 9,117,216 | B1 * | 8/2015 | Nguyen | G06Q 30/02 |
| 2003/0038849 | A1 * | 2/2003 | Craven | H04B 1/202 715/864 |

(Continued)

OTHER PUBLICATIONS

Linksys Access Restrictions (Dec. 26, 2011).*
Five parental control apps (May 1, 2012).*

*Primary Examiner* — Thu Ha Nguyen
(74) *Attorney, Agent, or Firm* — Chang & Hale LLP (57) ABSTRACT

A computer-implemented method of limiting access time to a computer network for client computing devices may comprise disposing an access controlling device such as router between the computer network and the client computing devices such that the client computing devices can only access the network through the access controlling device, at least while within an area of coverage thereof. A unique identifier may be stored for client computing devices whose access to the network is to be limited and a selectable allowable cumulative network access time period may be stored for at least some of these client computing devices. Using at least the unique identifiers, the cumulative network usage time may be tracked for each of the client computing devices. The access controlling device may then prevent further network access to those client computing devices whose tracked cumulative network usage time exceeds the selectable allowable cumulative network access time period.

20 Claims, 5 Drawing Sheets

(56) References Cited

U.S. PATENT DOCUMENTS

| | | | |
|---|---|---|---|
| 2003/0182150 A1* | 9/2003 | Reddy | G06Q 10/02 |
| | | | 705/5 |
| 2004/0158631 A1* | 8/2004 | Chang | H04L 41/24 |
| | | | 709/224 |
| 2010/0167694 A1* | 7/2010 | Chiussi | H04W 48/04 |
| | | | 455/411 |
| 2010/0205301 A1* | 8/2010 | Ansari | G06Q 30/04 |
| | | | 709/225 |
| 2010/0332615 A1* | 12/2010 | Short et al. | 709/217 |
| 2012/0101952 A1* | 4/2012 | Raleigh | G06Q 30/016 |
| | | | 705/304 |
| 2012/0263191 A1 | 10/2012 | Baron | |
| 2013/0031578 A1* | 1/2013 | Zhu | H04N 21/23109 |
| | | | 725/32 |
| 2015/0074259 A1* | 3/2015 | Ansari | H04L 67/02 |
| | | | 709/224 |
| 2015/0181283 A1* | 6/2015 | Maciej | H04N 21/4181 |
| | | | 725/31 |
| 2015/0264051 A1* | 9/2015 | Hoggan | H04L 63/0892 |
| | | | 726/1 |
| 2015/0347683 A1* | 12/2015 | Ansari | G06F 19/322 |
| | | | 726/7 |
| 2016/0080322 A1* | 3/2016 | Prisser | H04L 63/102 |
| | | | 726/1 |
| 2016/0254949 A1* | 9/2016 | Tong | H04L 41/0803 |
| | | | 370/254 |
| 2017/0063929 A1* | 3/2017 | Burbridge | H04L 61/1511 |

* cited by examiner

DEVICES AND METHODS CONFIGURED TO CONTROL NETWORK ACCESS TIME

BACKGROUND

Conventionally, parents wishing to limit their children's access to the Internet are reduced to taking the child's computer or mobile device away, installing client-side parental-control software on the child's computer or mobile device and configuring the parental-control software to only allow access between specified times, on each device. Unfortunately, such client-side parental-control software is easily circumvented by tech-savvy children. Indeed, the software may be disabled by removing the software, returning the computer or mobile device to its factory configuration, and other techniques. This renders the parent's job difficult and requires a great deal of day-to-day involvement on the parent's part, rendering such client-side parental-control software less than practical or easy to use, in most cases.

The other way to limit a child's access to the Internet would be to physically disable the router and/or modem when access is to be disabled. However, this also prevents all other users from accessing the network.

What are desired, therefore, are methods and devices that would enable a parent to effectively limit a child's access to the Internet to a selectable number of hours a day or week. Such methods and devices should not require the installation and maintenance of client-side parental-control software and should be effective to apply selectable access restrictions to all or selected devices accessing the Internet. Finally, such methods and devices should be relatively tamper-proof by children and should allow flexibility in setting and changing the number of hours or minutes computers and mobile devices are allowed to access the Internet.

DETAILED DESCRIPTION

One embodiment enables parents or guardians to limit the number of hours or minutes for each or selected network-accessing devices within their home network. Such network accessing devices may comprise, for example, computers, laptops, tablet computing devices, mobile phone and the like.

According to one embodiment, such functionality is embodied in the router, which then is not only the centralized gateway to the Internet, but also becomes the timekeeper of access thereto. According to one embodiment, the router comprises flexible built-in mechanisms to enforce parental (for example) decisions regarding the total number of hours or minutes of Internet access allowed for each selected network accessing device or devices. A router configured according to one embodiment offers a high-level of granularity in the selection of time limits across all of the family's network-accessing devices and enables a high degree of flexibility in regulating the amount of Internet access time allowed for each accessing device or group of accessing devices.

According to one embodiment, the router may be configured to keep track of the cumulative time any particular device has been allowed to access the Internet and disables that access when the device has been access-enabled for a cumulative period of time equal to the selectable allowable cumulative network access time period for that device or group of devices. According to one embodiment, the client devices need not comprise parental-control software or any other network access control client-side software, as all network access control may be maintained within the router.

Figure 1:
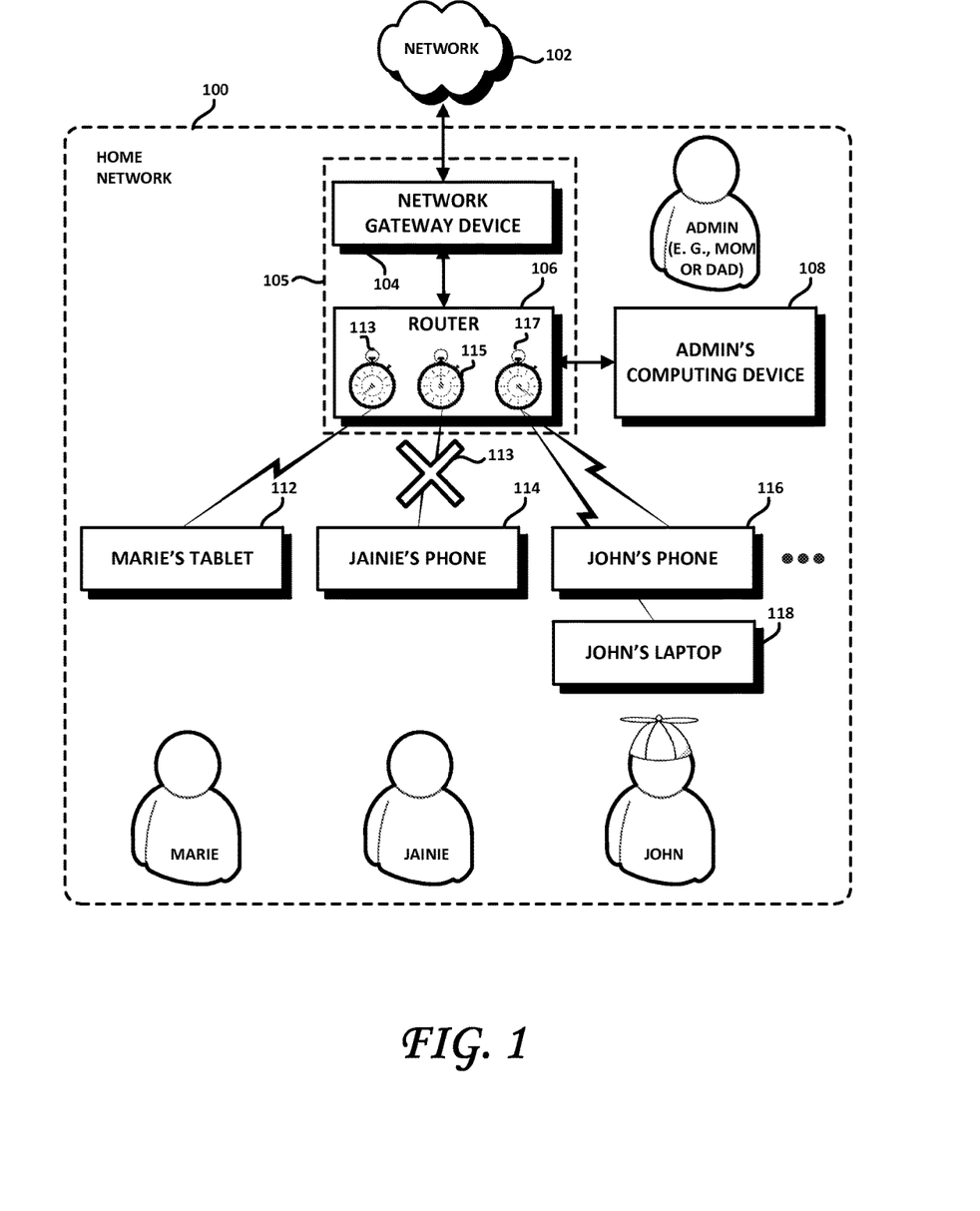
FIG. 1 is a diagram of a network incorporating aspects of one embodiment.

FIG. 1 is a diagram of a network and system incorporating aspects of one embodiment. As shown therein, a home network 100 may comprise a network gateway device 104 such as, for example, a modem. The network gateway device 104 may be configured to enable access to a network 102 that may comprise, for example, the Internet. A router 106 according to one embodiment may be coupled to the network gateway device 104. The router 106 may be configured to join networks 100 and 102 and to route data traffic therebetween. The router may be assigned an Wide Area Network (WAN) Internet Protocol (IP) address and may select a Local Area Network (LAN) IP address that does not conflict with the WAN IP address in in the manner, for example, disclosed in co-pending and commonly-assigned U.S. patent application Ser. No. 13/xxx,xxx, which is incorporated herein in its entirety. The router 106 may be also configured to comprise a user interface that is selectively accessible to properly authenticated network accessing devices. According to one embodiment, the router 106 may implement a computer-implemented method of limiting access time to the network 102 to one or more client computing devices, such as shown at 112, 114, 116 and 118. According to one embodiment, the router 106 may be disposed between the network 102 and the plurality of client computing devices 112, 114, 116 and 118 such that the plurality of client computing devices 112, 114, 116 and 118 can only access the computer network through the router 106, at least while within the area of coverage thereof. According to one embodiment, the network gateway device 104 and the router 106 may be integrated into a single integrated modem-router 105 that incorporates the functionality of both the network gateway device 104 and the router 106. Such an embodiment may further limit the network accessing devices 112, 114, 116 and 118 from circumventing the network access limits by plugging his or her network accessing device 112, 114, 116 and 118 directly into the network gateway 104.

As suggested by the timers at reference numerals 113, 115 and 117, the router 106 may be configured track the cumulative network usage time for each of the plurality of client computing devices 112, 114, 116 and 118, respectively, whose access to the computer network 102 is to be limited. That is, as suggested at 113, the router 106 may be configured to track the cumulative network usage time of Marie's tablet computing device 112. Similarly, as suggested at 115, the router 106 may be configured to track the cumulative network usage time of Jainie's phone 114. Likewise, the router 106 may be configured to track the cumulative network usage time of John's phone 116 and of John's laptop computer 118. According to one embodiment, each of John's devices 116, 118 may be assigned a separate and independent allowable cumulative network access time period. Alternatively, according to one embodiment, a group of network accessing devices, such as John's phone 116 and laptop computer 118 in the example being developed herewith, may share a single allowable cumulative network access time period. In this case, time accessing the network 102 on both devices is cumulative and the sum of the network access times of each device is added together and subtracted from the allowable cumulative network access time period assigned to the group of devices comprising network accessing 116 and 118.

As conceptually shown by the timer 115, the allowable cumulative network access time period for Jainie's phone 114 has come to an end. Accordingly, further access to the network 102 by Jainie's phone 114 may be disallowed, as symbolically shown at 113. As shown at 112, Marie's tablet computing device's tracked cumulative network usage time has not yet exceeded the selectable allowable cumulative network access time period, meaning that her computing device 112 still has unfettered access to the network 102, or at least the same level of access thereto that she previously enjoyed. Similarly, the group of computing devices defined by John's phone 116 and John's laptop 118 tracked cumulative network usage time has also not yet exceeded the selectable allowable cumulative network access time period, and thus is not also prevented from accessing the network 102 until such time as that condition no longer holds true.

As shown at 108, according to one embodiment, a computing device 108 that presents the proper credentials to the router 106 may access a secure administrator UI enables the operator thereof to select, among other functions, the allowable cumulative network access time period for a selected one or ones of the client computing devices 112, 114, 116, 118. In the home environment, the administrator is likely to be Mom or Dad, a guardian or other responsible party. According to one embodiment, any computing device that presents the proper credentials (e.g., username and password) to the router 106 may be granted access the administrator functions and may thus be considered to be the Admin's computing device as shown at reference 108 in FIG. 1. For example, the Admin computing device 108 may be a mobile device such as a smart phone.

Figure 2:
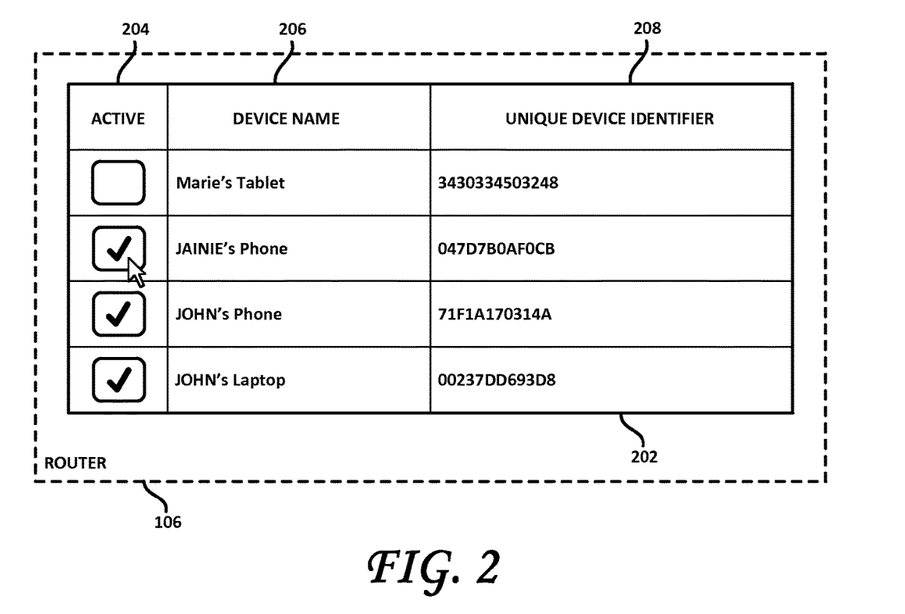
FIG. 2 shows a correspondence table associating device names and unique identifiers, according to one embodiment.

FIG. 2 shows a correspondence table configured to associate device names and unique identifiers, according to one embodiment. As shown therein, the router 106 (or integrated router-modem 105) may be configured to store and maintain a table or database 202 that stores or references a unique identifier for each of the plurality of client computing devices whose access to the computer network is to be limited. As shown in FIG. 2, the table 202 may comprise, for each client computing device, an entry 204 indicative of whether network access time limitations are to be imposed for that device. Table 2 also shows at 206 a friendly name ("Marie's Tablet", "Jainie's Phone", etc.) for each of the client computing devices whose access to the network 102 is to be limited. At 208, FIG. 2 shows a column comprising a unique device identifier for each of the client computing devices whose access to the network 102 is to be limited. According to one embodiment, the router 106 may associate the unique device identifiers 208 with the friendly device name 206. According to one embodiment, the unique device identifier 208 may comprise a Media Access Control (MAC) address of the client computing device, as shown in FIG. 2. The unique device identifier may also comprise or be based on, according to one embodiment, the IP address of the client computing device. Those of skill in this art will recognize that other quantities may be used for a device unique identifier 208.

According to one embodiment, an allowable cumulative network access time period may be selected for each client computing devices whose access to the computer network is to be limited. The selected allowable cumulative network access time period may be associated, by the router 106 with the client computing devices whose access to the computer network 102 is to be limited. Selection and association of the allowable cumulative network access time period may be carried out for each client computing device whose access to the network 102 is to be limited. Thereafter, according to one embodiment, using at least the unique identifiers, the router 106 may track a cumulative network usage time for each of the plurality of client computing devices whose access to the computer network is to be limited. Indeed, the router may be configured to start or resume a counter upon a client computing device requesting access to the network 102 and may stop the counter when the client computing device is no longer accessing the network 102. According to one embodiment, the router 106 may then prevent further network access by that or those client computing devices whose tracked cumulative network usage time exceeds their selectable allowable cumulative network access time period.

Figure 3:
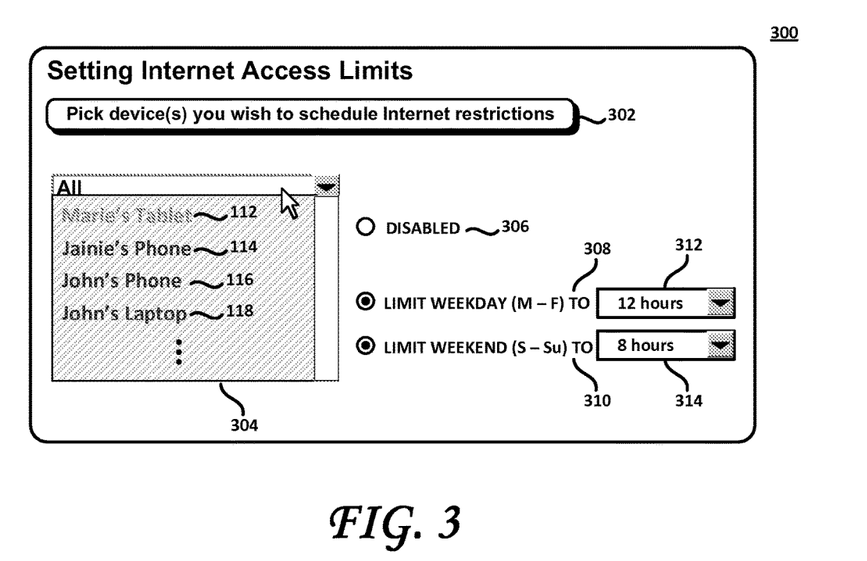
FIG. 3 shows an exemplary User Interface (UI) according to one embodiment.

FIG. 3 shows an exemplary User Interface (UI) according to one embodiment. As shown in FIG. 3, the UI 300 enables selection of the allowable cumulative network access time period for each client computing device whose access to the network 102 is to be limited. The UI 300 may comprise, for example, a "Setting Internet Access Limits" screen in which the Admin may be invited to select the client computing device or devices for which access to the network 102 is to be limited, as suggested at 302. For example, a pull-down menu 304 may be provided, enabling the Admin to select one or more client computing devices (such as 112, 114, 116, 118 in FIG. 1) for which network access is to be limited. Some previously-registered client computing devices may be absent or greyed out, as shown at 112. In this case, Marie's tablet would not be subject to network access limitations, consistent with Marie's tablet not being designated as "Active" in FIG. 2. In FIG. 3, the Admin has decided to select "All", meaning to select all active (i. e., not greyed out") client computing devices; namely, Jainie's phone 114, John's phone 116 and John's laptop 118. For each of these client computing devices, the allowable cumulative network access time period may be selected. Although only hours are shown in the figures, those of skill may recognize that the selection of minutes may also be enabled. One or more interval periods (e.g., weekdays 308, weekend days 310) may be define and, for each of these interval period, a separate and independent allowable cumulative network access time period 312, 314 may be selected. Other interval periods (e.g., months) may also be provided. Selection of the allowable cumulative network access time period for each interval period(s) may be selected via, for example, one or more pull-down menus, as shown in FIG. 3. Other graphic devices (e.g., radio buttons, sliders, dials and the like) may be used to enable easy selection of the allowable cumulative network access time period for each client computing device or groups thereof, as those of skill in this art may recognize. As also shown in FIG. 3, one or more radio buttons may be used to enable or disable any network access time restrictions as shown at 308, to enable or disable network access restrictions for any defined interval periods. For example, an Admin may deselect the radio button adjacent the "weekend" interval period 310, to thereby allow unlimited access to the network 102 over the weekend. Accoridng to one embodiment, any selected allowable cumulative network access time period may reset at the end of its interval period. For example, the selected allowable cumulative network access time period (12 hours in the example of FIG. 3) may reset at the end of "weekday" interval period; namely, Saturday morning. Once reset, the client computing device subject to such selected allowable cumulative network access time period would once again be allowed to access the network 102 for the selected allowable cumulative network access time period during the week to come.

For any reason, should one of the users (e.g., Marie, Jainie or John in the example being developed herewith) need to their computing device or devices to access the network 102 for a period of time longer than the selected allowable cumulative network access time period, the Admin, through the Admin's computing device 108, may be provided with the option of selecting the appropriate client computing device and disabling network access time restrictions by, for example, selecting radio button 306. Alternatively, the Admin may simply extend the number of hours of the selected allowable cumulative network access time period at 312 or 314.

Figure 4:
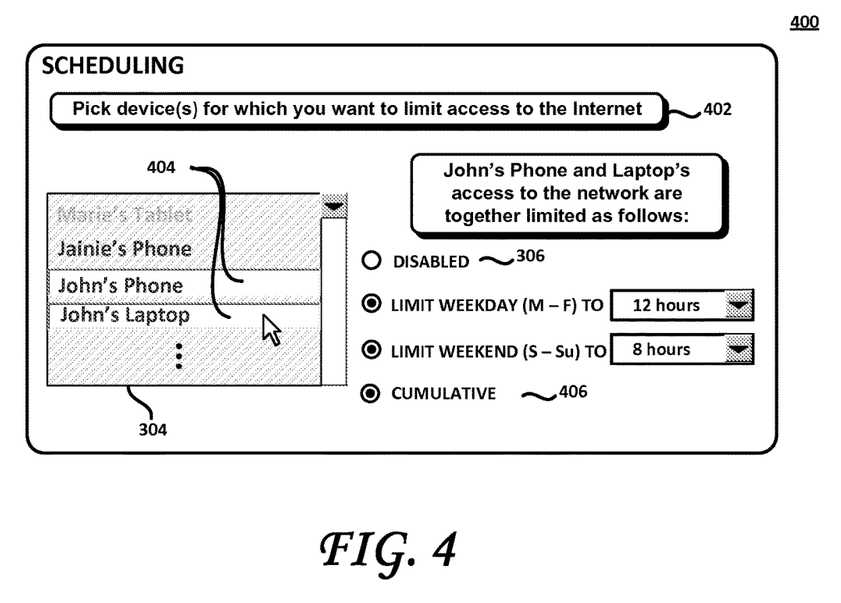
FIG. 4 shows an exemplary UI according to one embodiment.

As shown in FIG. 4, by selecting more than one client device, a group of client computing devices may be formed, in which the constituent members thereof may each separately be limited to the selected allowable cumulative network access time period or may be caused to share the selected allowable cumulative network access time period. As shown in FIG. 4, John's Phone and John's laptop computer have been selected as shown at and thus form a group 404. For example, if the "Cumulative" radio button 406 is selected, the constituent members of the group 404 may be caused to share the selected allowable cumulative network access time periods of, in this example, 12 hours and 8 hours for the weekday and weekend time intervals. Alternatively, if the "Cumulative" radio button 406 is not selected, the constituent members of the group 404 may be each be allowed to access the network 102 for 12 and 8 hours for the weekday and weekend time intervals, respectively.

Figure 5:
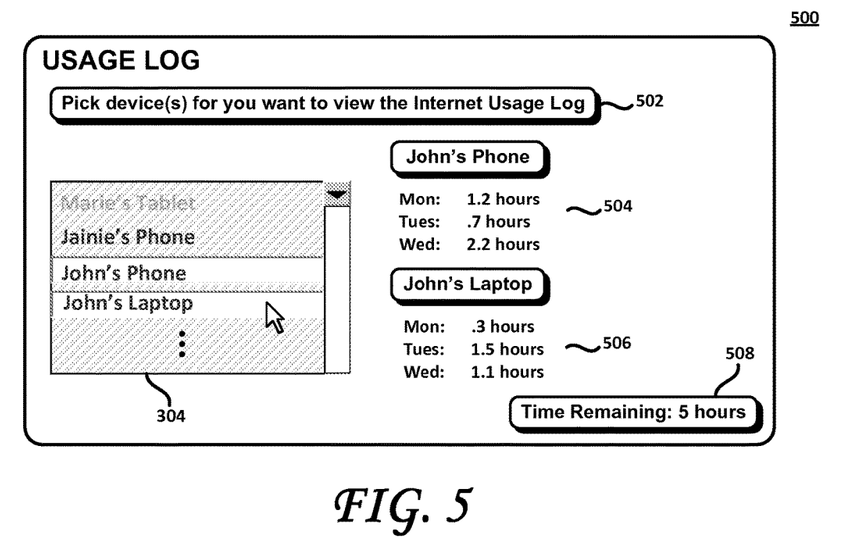
FIG. 5 shows an exemplary UI according to one embodiment.

According to one embodiment, the router 106 may be configured to generate a usage log for any of the plurality of client computing devices whose cumulative network usage time is tracked. At reference 500, FIG. 5 shows an exemplary layout of such a usage log. According to one embodiment, such a usage log may be generated and made available to the Admin, through the Admin computing device 108. The UI through which the log is requested and viewed may, as shown at 502, invite the Admin to select the client computing device(s) for which the Admin wishes to generate a usage log. One or more of the friendly names 206 of the network accessing computing devices may be selected. In the example of FIG. 5, John's Phone and John's Laptop are selected, as shown in the pull down menu 304. As a result of such selection, a usage log 504 of John's phone and a usage log 506 of John's Laptop may be generated and rendered for the Admin. An accounting of the remaining allowable cumulative network access time period may be shown, as suggested at 508. As those of skill may recognize, the usage log 500 may take on other forms and may be delivered via other mechanisms. For example, a text, audio, video or an email message may be generated to a predetermined recipient or recipients. Moreover, alerts may be generated, rendered and delivered to the Admin and/or to the users of the client computing devices, alerting them, for example, that they are nearing their allowable cumulative network access time period. Within the present context, the term "log" is expressly intended to encompass all such logs, notifications and alerts, however or whenever rendered and/or delivered. For example, a log 500 may be generated on demand, on a fixed predetermined schedule and/or asynchronously upon the occurrence of one or more events.

Figure 6:
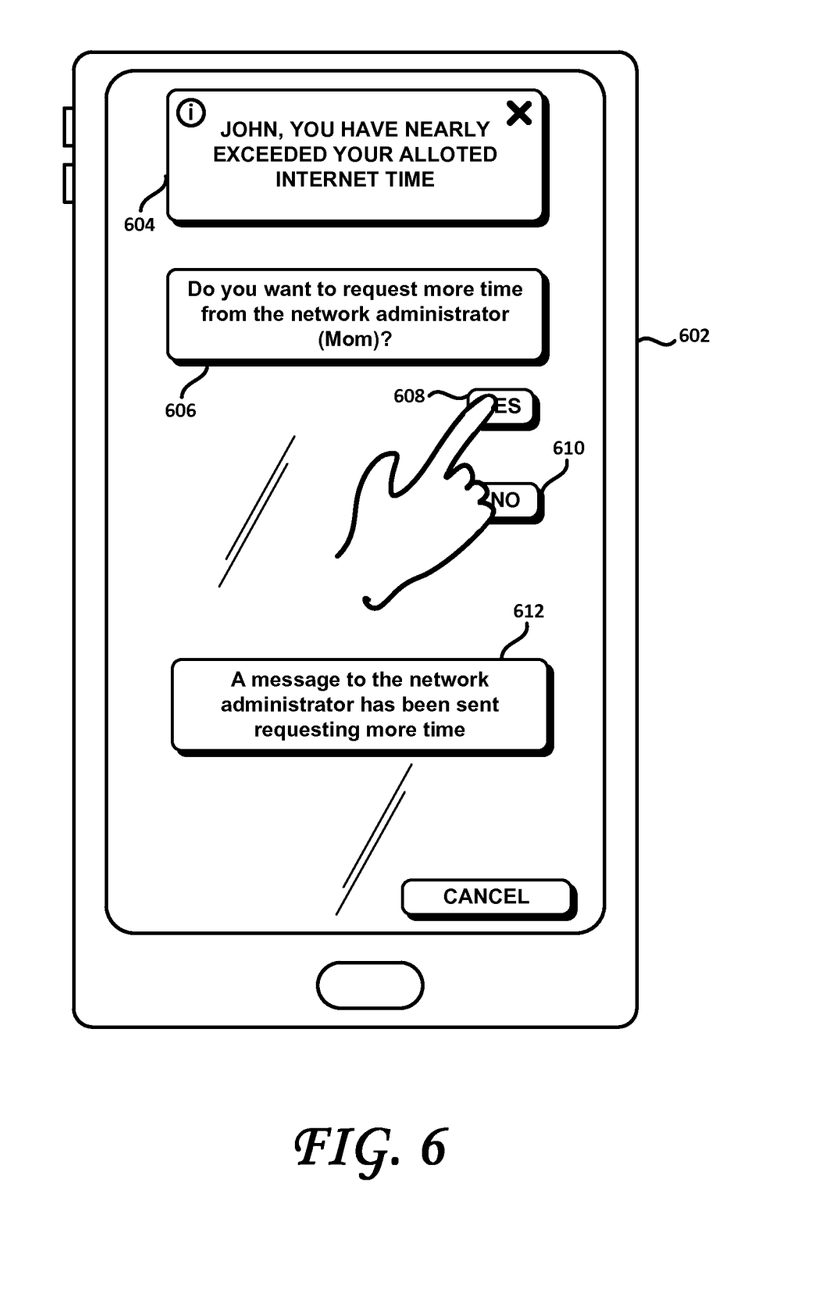
FIG. 6 shows a mobile device illustrating further aspects of one embodiment.

FIG. 6 shows a mobile device 602 illustrating further aspects of one embodiment. As shown, the router 106 may be configured to generate and send a message to a client computing device such as mobile computing device 602. The message, for example, may comprise an alert 604 to the effect that the client computing device has nearly exceeded its allowable cumulative network access time period, as shown at 604. A further message may also be generated and sent to the mobile device 602, asking whether more time should be requested from the Admin, as suggested at 606. The router 106 may also cause "Yes" and "No" buttons 608, 610 to be generated on the mobile device 602, enabling the user thereof to request more time from the Admin. As shown in FIG. 6, the operator has depressed the "Yes" button 608, which causes the mobile device 602 to send and the router 106 to receive a request for more time from the mobile device 602. The router 106 may then send a message to the Admin (via text message or email, for example), informing the Admin that the operator of mobile device 602 has requested more network access time. The router 106 may then cause the mobile device to acknowledge the sending of such a message, as shown at 612. Alternatively, the router 106 may be configured to programmatically grant or deny such requests based upon one or more selectable criteria.

Figure 7:
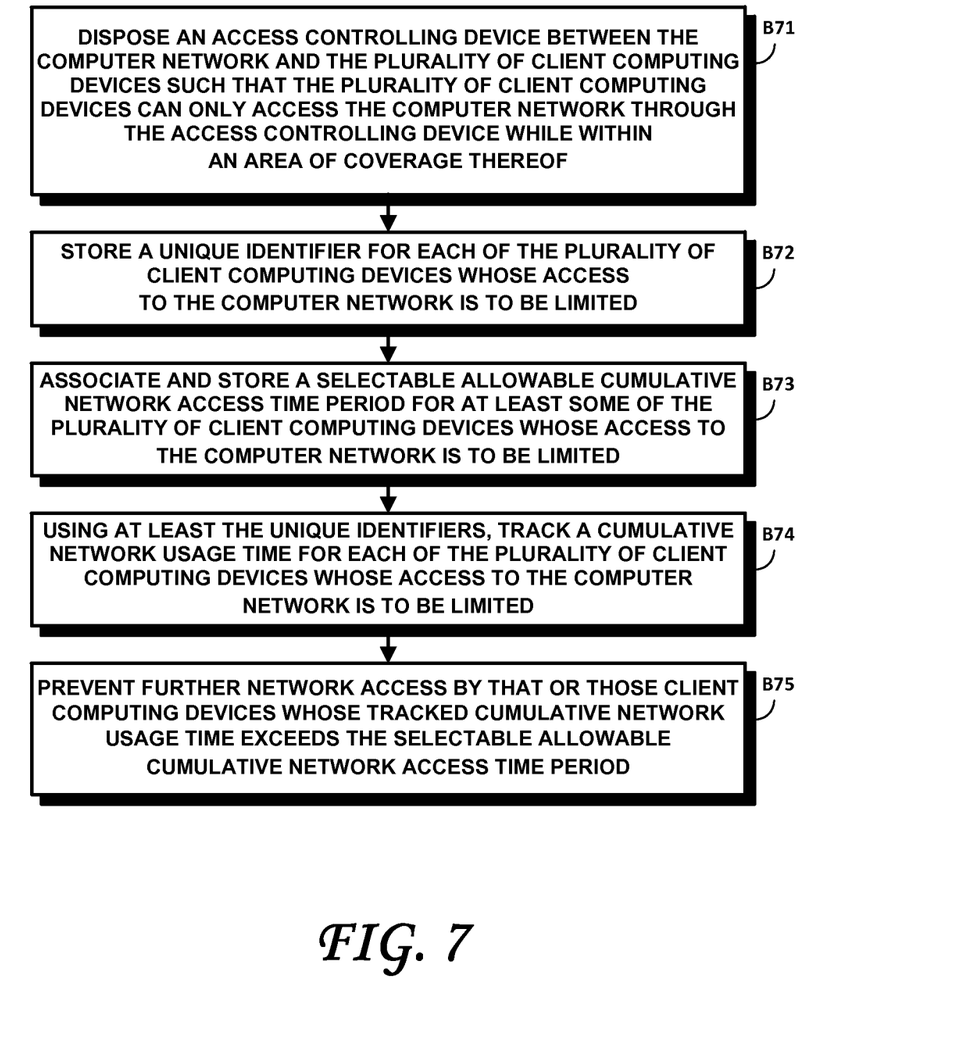
FIG. 7 is a flowchart illustrating a method according to one embodiment.

FIG. 7 is a flowchart of a method according to one embodiment. Specifically, FIG. 7 is a flowchart of method of limiting access time to a computer network for a plurality of client computing devices. As shown, Block B71 calls disposing an access controlling device, such as a router 106, between the computer network 102 and the plurality of client computing devices 112, 114, 116, 118 such that the plurality of client computing devices 112, 114, 116, 118 can only access the computer network through the access controlling device (e.g., router 106 or modem router 105) while within the area of coverage thereof—typically within the home or within the area of coverage of the wireless LAN generated by the router 106. Block B72 calls for storing a unique identifier 208 for each of the plurality of client computing devices 112, 114, 116, 118 whose access to the computer network 102 is to be limited. Block B73 calls for associating and storing a selectable allowable cumulative network access time period for at least some of the plurality of client computing devices 112, 114, 116, 118 whose access to the computer network 102 is to be limited. Thereafter, Block B74 calls for, using at least the unique identifiers 208, tracking the cumulative network usage time for each of the plurality of client computing devices whose access to the computer network 102 is to be limited. Lastly, Block B75 of FIG. 7 calls for preventing further network access by that or those client computing devices 112, 114, 116, 118 whose tracked cumulative network usage time exceeds the selectable allowable cumulative network access time period.

While certain embodiments of the disclosure have been described, these embodiments have been presented by way of example only, and are not intended to limit the scope of the disclosure. Indeed, the novel devices and assemblies described herein may be embodied in a variety of other forms. Furthermore, various omissions, substitutions and changes in the form of the devices and assemblies described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of limiting access time to a wide area computer network from a home network for a plurality of controlled client computing devices, comprising:
   disposing, on the home network, an access controlling device comprising at least one of a network gateway and a router between the wide area computer network and the plurality of controlled client computing devices, wherein:
      the plurality of controlled client computing devices can access the wide area computer network only through the access controlling device while within an area of coverage thereof; and
      the plurality of controlled client computing devices operates without client-side parental-control software for controlling access to the wide area computer network;
   storing, on the access controlling device, a unique identifier for each of the plurality of controlled client computing devices whose access to the wide area computer network is to be limited;
   associating and storing, on the access controlling device, a selectable allowable cumulative network access time period, received from an administrator computing device on the home network, for at least some of the plurality of controlled client computing devices whose access to the wide area computer network is to be limited;
   using at least the unique identifiers, tracking a cumulative network usage time for each of the plurality of controlled client computing devices whose access to the wide area computer network is to be limited;
   providing, through a user interface accessible on at least one of the plurality of controlled client computing devices, a mechanism configured to enable a user of the at least one of the plurality of controlled client computing devices whose cumulative network usage time is tracked to send a request for additional network usage time to the access controlling device;
   receiving, in the access controlling device, the sent request for additional network usage time;
   selectively granting or denying, by the access controlling device, the received request for additional network usage time; and
   preventing, by the access controlling device, further access to the wide area computer network by the controlled client computing devices whose tracked cumulative network usage time meets or exceeds the selectable allowable cumulative network access time period while allowing access to the wide area computer network to those controlled client computing devices whose tracked cumulative network usage time does not exceed the selectable allowable cumulative network access time period.

2. The computer-implemented method of claim 1, wherein the unique identifier comprises a Media Access Control (MAC) address of the controlled client computing device.

3. The computer-implemented method of claim 2, wherein the unique identifier is further based on an Internet Protocol (IP) address of the controlled client computing device.

4. The computer-implemented method of claim 1, further comprising enabling selection of the allowable cumulative network access time period for at least some of the plurality of controlled client computing devices through a secure user interface.

5. The computer-implemented method of claim 1, wherein associating comprises selecting a first allowable cumulative network access time period for a first span of time and a second allowable cumulative network access time period for a second span of time.

6. The computer-implemented method of claim 5, wherein:
   the first span of time comprises weekdays; and
   the second span of time comprises weekend days.

7. The computer-implemented method of claim 1, further comprising generating a usage log for any of the plurality of controlled client computing devices whose cumulative network usage time is tracked.

8. The computer-implemented method of claim 1, further comprising linking at least a first one of the plurality of controlled client computing devices and a second one of the plurality of controlled client computing devices such that the linked controlled client computing devices together share the selectable allowable cumulative network access time period.

9. The computer-implemented method of claim 1, further comprising routing network traffic for the plurality of controlled client computing devices whose cumulative network usage time is tracked until respective tracked cumulative network usage times meet or exceed corresponding selectable allowable cumulative network access time periods.

10. The computer-implemented method of claim 1, wherein the access controlling device is further configured as a network gateway device.

11. A network access device located on a home network and configured to limit access time to a wide area computer network for a plurality of controlled client computing devices located within an area of coverage of the network access device, the plurality of controlled client computing devices configured to operate without a client-side parental-control software, the network access device being configured to:
   (1) store, on the network access device, a unique identifier for each of the plurality of controlled client computing devices whose access to the wide area computer network is to be limited;
   (2) associate and store, on the network access device, a selectable allowable cumulative network access time period, received from an administrator computing device on the home network, for at least some of the plurality of controlled client computing devices whose access to the wide area computer network is to be limited;

(3) using at least the unique identifiers, track a cumulative network usage time for each of the plurality of controlled client computing devices whose access to the wide area computer network is to be limited;

(4) provide, through a user interface accessible on at least one of the plurality of controlled client computing devices, a mechanism configured to enable a user of the at least one of the plurality of controlled client computing devices whose cumulative network usage time is tracked to send a request for additional network usage time to the network access device, the network access device being configured as at least one of a network gateway and a router;

(5) receive, in the network access device, the sent request for additional network usage time;

(6) selectively grant or deny, by the network access device, the received request for additional network usage time; and (7) prevent, by the network access device, further access to the wide area computer network by the controlled client computing devices whose tracked cumulative network usage time meets or exceeds the selectable allowable cumulative network access time period while allowing access to the wide area computer network to those controlled client computing devices whose tracked cumulative network usage time does not exceed the selectable allowable cumulative network access time period.

12. The network access device of claim 11, wherein the unique identifier comprises a Media Access Control (MAC) address of the controlled client computing device.

13. The network access device of claim 12, wherein the unique identifier is further based on an Internet Protocol (IP) address of the controlled client computing device.

14. The network access device of claim 11, wherein the network access device is further configured to enable selection of the allowable cumulative network access time period for at least some of the plurality of controlled client computing devices through a secure user interface.

15. The network access device of claim 11, wherein the network access device is further configured to associate a selectable first allowable cumulative network access time period for a first span of time and a selectable second allowable cumulative network access time period for a second span of time.

16. The network access device of claim 15, wherein:
the first span of time comprises weekdays; and
the second span of time comprises weekend days.

17. The network access device of claim 11, wherein the network access device is further configured to generate a usage log for any of the controlled client computing devices whose cumulative network usage time is tracked.

18. The network access device of claim 11, wherein the network access device is further configured to link at least a first one of the plurality of controlled client computing devices and a second one of the plurality of controlled client computing devices such that the linked controlled client computing devices together share the selectable allowable cumulative network access time period.

19. The network access device of claim 11, wherein the network access device is further configured to route network traffic for the plurality of controlled client computing devices whose cumulative network usage time is tracked until respective tracked cumulative network usage times meet or exceed corresponding selectable allowable cumulative network access time periods.

20. The network access device of claim 11, wherein the network access device is further configured as a network gateway device.

* * * * *